INVENTOR.
JOHN K. KENNEDY

United States Patent Office 3,310,383
Patented Mar. 21, 1967

3,310,383
CONTINUOUS MULTI-STAGE VOID DIFFERENTIAL-DENSITY HYBRID ZONE MELTING APPARATUS
John K. Kennedy, West Roxbury, Mass., assignor to the United States of America as represented by the Secretary of the Air Force
Filed June 1, 1964, Ser. No. 371,858
1 Claim. (Cl. 23—273)

The invention described herein may be manufactured and used by or for the U.S. Government for governmental purposes without payment to me of any royalty thereon.

This invention relates generally to the purification of chemical elements or compounds, and more particularly, to a purification apparatus which utilizes the effect of causing a separation of the impurities as a result of the density differential between soluble impurities and the liquid solvent in a continuous, multi-stage, zone melting apparatus.

In application Ser. No. 81,203, filed on Jan. 6, 1961, now Patent No. 3,243,266, of which I was one of the inventors, the combination of a zone purification apparatus utilizing both zone-void and matter transport in the stripping and enriching sections, respectively, was presented. This apparatus was limited to materials having a density differential between the solid and liquid phases greater than 1. It was determined that there was a need for an apparatus capable of being utilized under all conditions with variations in the parameters of density and segregation coefficient.

Accordingly, it is an object of this invention to provide a novel apparatus which utilizes both zone-void and matter transport in a purification apparatus which is operable with all density ratios and segregation coefficients.

It is another object of this invention to provide a purification apparatus for a continuous purification system to produce ultra-pure material.

Figure 1:
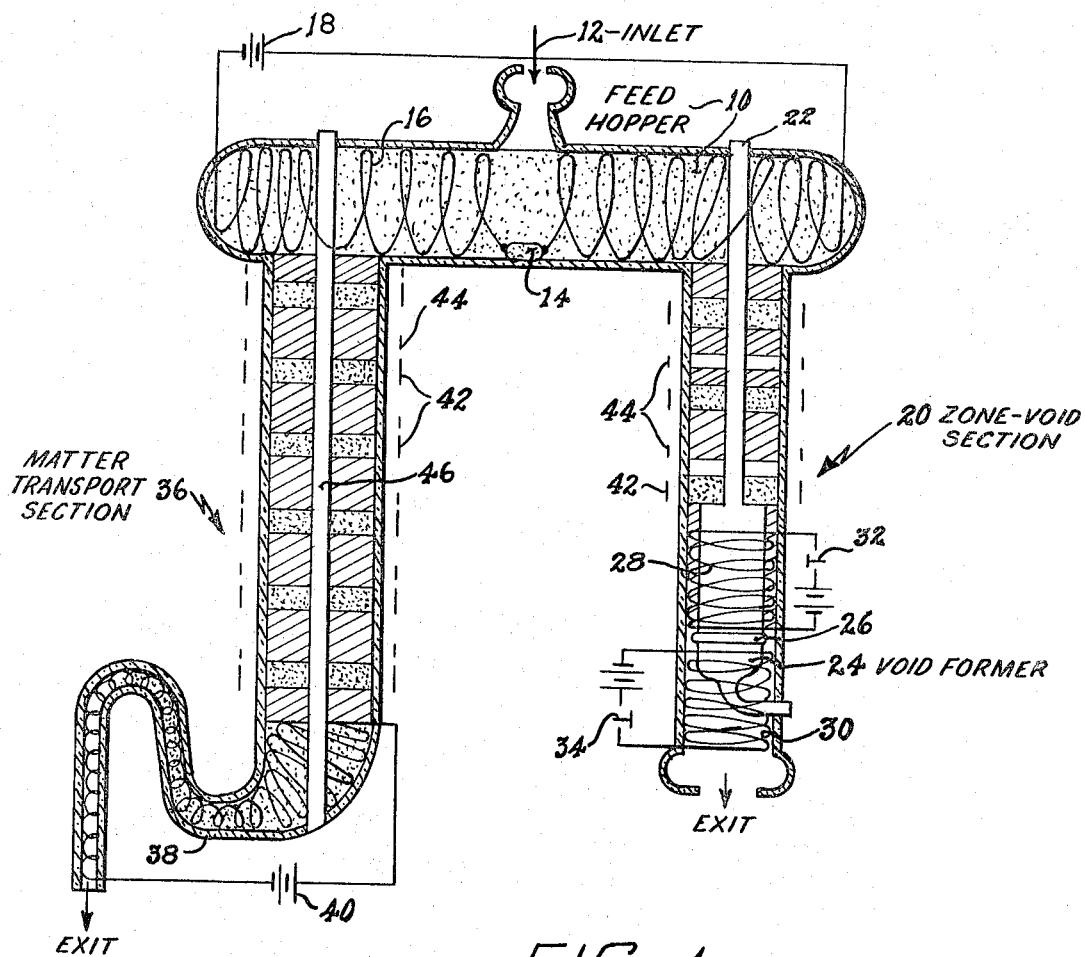
Figure 2:
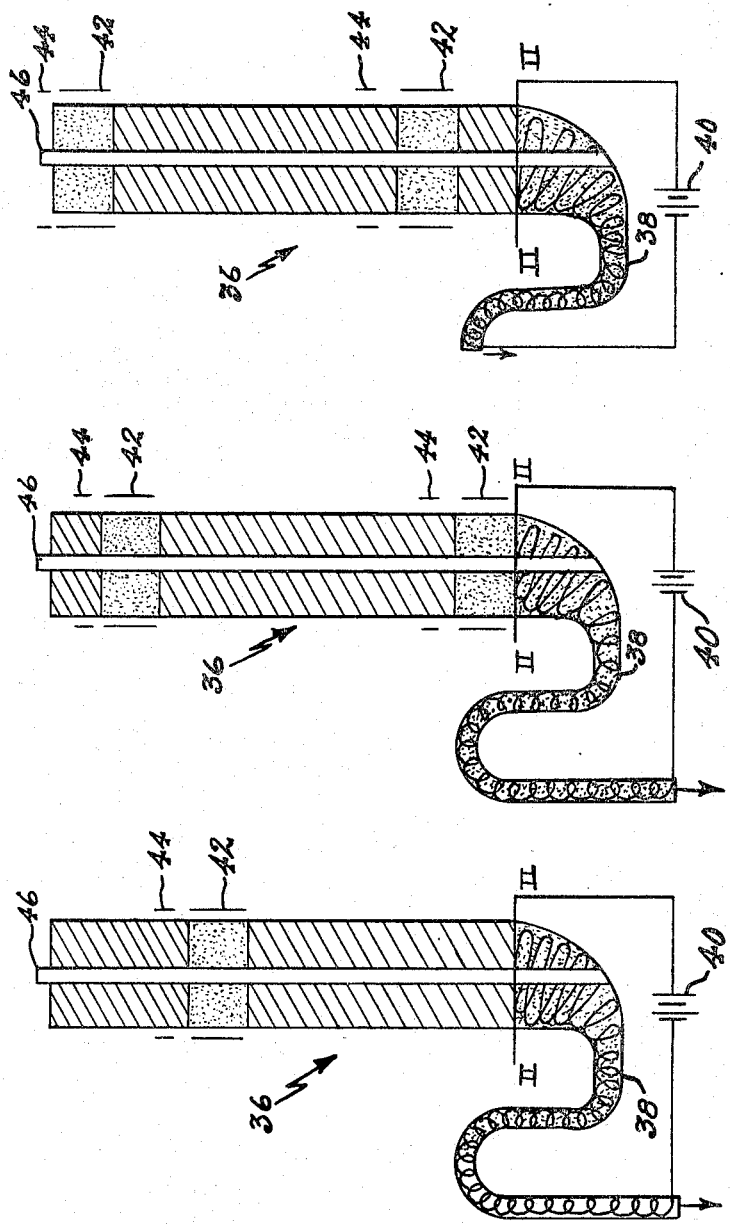
Figure 3:
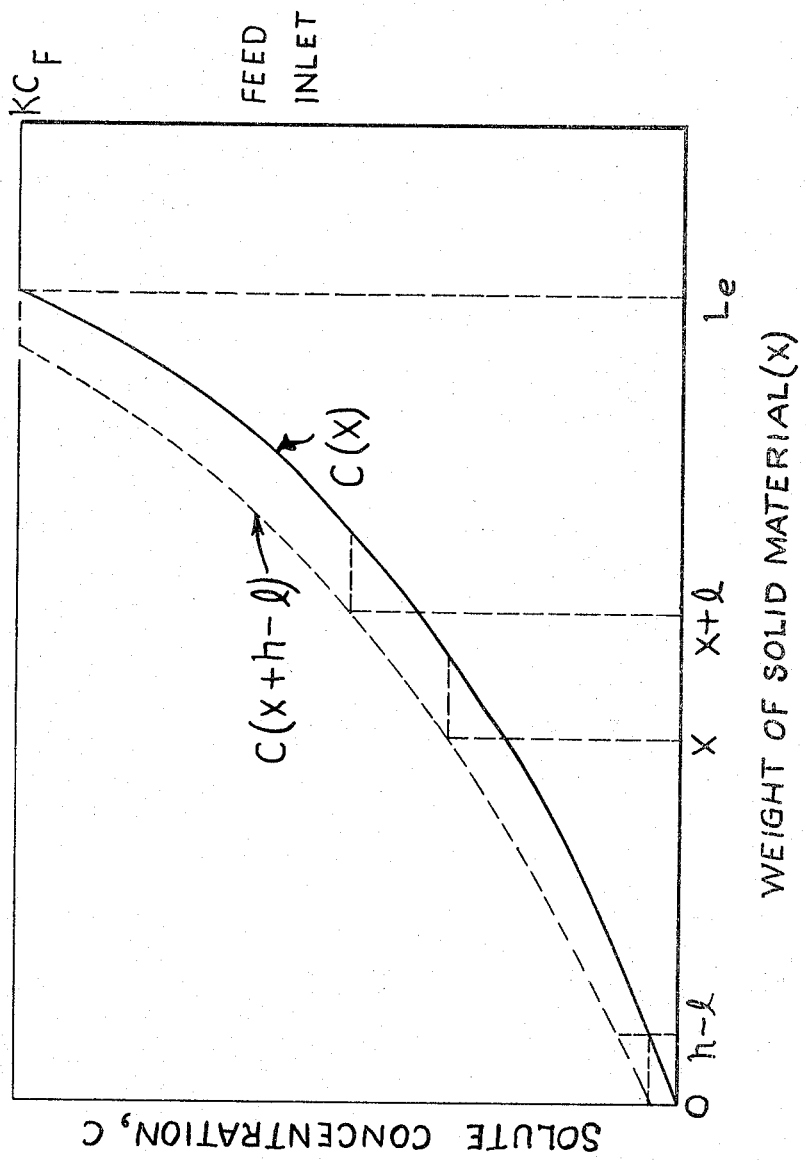

These and other advantages, features and objects of the invention will become more apparent from the following description taken in connection with the illustrative embodiments in the accompanying drawings, wherein:

FIGURE 1 is a schematic representation of a continuous zone-refining system with the matter transport section located below the feed;

FIGURES 2A through C are schematic illustrations of material collection in the matter transport section of FIGURE 1; and FIGURE 3 is an illustration of the steady state solute distribution in the matter transport section; the dashed curve portraying the shift in distribution caused by passage of a less dense liquid zone.

Referring to FIGURE 1, there is shown an apparatus where feed enters and product and waste leave the system, thereby providing a continuous process. The system comprises an horizontal feed hopper section 10 with an opening at 12 forming an inlet. Within the feed hopper 10 there is provided a magnetic stirring element 14 capable of being moved to cause agitation of the feed material within the hopper by means of an external magnet (not shown). Material within the hopper 10 is maintained in the molten state by means of a conventional heating coil 16 which is connected to a suitable power supply as illustrated schematically at 18.

The zone-void section of the device indicated at 20 allows for the flow of material by producing voids at the product or waste exits and causing them to travel to the feed inlet. This process has been described in abondoned application Ser. No. 817,688, filed June 2, 1959, and in the aforementioned copending application Ser. No. 81,203, which is now Patent No. 3,243,266. Material flow is accomplished by collecting an amount of material per pass which is equal to the volume of the void produced. The zone-void section has a hollow tube 22 for aiding in obtaining planar solid-liquid interfaces. Depending from said tube 22 is the void former 24 which is comprised of an enlarged tube within the zone-void column with an annular projection 26. Associated with the void former end of the zone-void column are heaters 28 and 30 and timers 32 and 34 which operate with the void former structure in accordance with the description of the device in Review of Scientific Instruments, 1962, volume 33, page 387.

In the embodiment of FIGURE 1, the matter transport section, labeled 36 utilizes matter transport as a means of material movement because of a density differential in accordance with the teachings of application Ser. No. 81,203. Previous theories of continuous zone refining appearing in textbooks such as that of Pfann entitled, "Zone Melting," by John Wiley & Sons, New York, N.Y., 1958, assumed a constant density. However, when matter transport is used to provide material movement, constant density may not be assumed since it is the change in density which is responsible for matter transport. The apparatus presented in application Ser. No. 81,203 requires having the outlet of the enriching section at the highest point in the section and having the density of the solid phase greater than that of the liquid. The following table is presented to show the universality and flexibility of the refining system of FIGURE 1 over that shown in the aforementioned copending application.

TABLE 1.—NATURE OF SECTIONS AND DIRECTION OF HEATER TRAVEL IN FIGS. 1 AND 2 FOR THE VARIOUS PERMUTATIONS OF $D_s$, $D_l$ AND $k$

|  | Nature of the Matter Transport Section | Direction of Heater Travel in the Matter Transport Section | Nature of the Void Section | Direction of Heater Travel in the Void Section | Apparatus Arranged According to— |
|---|---|---|---|---|---|
| $D_l<D_s$, $k<1$ | Enriching | Down | Stripping | Down | (a). |
| $D_l<D_s$, $k<1$ | do | Up | do | do | (b). |
| $D_l<D_s$, $k>1$ | Stripping | Down | Enriching | do | (a). |
| $D_l<D_s$, $k>1$ | do | Up | do | do | (b). |
| $D_l>D_s$, $k<1$ | IMPOSSIBLE | | | | (a). |
| $D_l>D_s$, $k<1$ | Stripping | Down | Enriching | Up | (b). |
| $D_l>D_e$, $k>1$ | IMPOSSIBLE | | | | (a). |
| $D_l>D_s$, $k>1$ | Enriching | Down | Stripping | Up | (b). |

(a) App. Ser. No. 81,203.
(b) Fig. 1, this App.

The material collection in the matter transport section of FIGURE 1 may be explained in reference to FIGURES 2A through C with $D_s>D_l$. The heating unit 38, connected to a power supply 40, is located at the end of the matter transport column and follows the inverted U-shape contour. When the density of the solid is greater than the density of the liquid, heater 42 movement is in the upper direction only. The operation of section 36 with variations in the parameters would conform with that specified in the table. In FIGURE 2A, the moving heaters 42 are about to reciprocate and start a new cycle, the heater 38 at the bottom of the tube being continuously operated to keep the material therein in a liquid condition. In the figures solid material is indicated by cross hatching while molten material is dotted. In FIGURE 2B, the bottom moving heater 42 has established a new molten zone immediately above the heater 38 which is in continuous operation at the solid liquid interface II—II. The melting, where the density of solid is greater than the density of liquid, causes the material to expand and overflow the inverted U-tube. Although the tube is shown as an inverted U, it should be understood that the downward outlet could be eliminated and the tube broken at its top-most portion, as illustrated in FIGURE 2C. In FIGURE 2C, the heaters 42 have moved up and the solid has frozen starting at interface II—II. Thus, when the liquid zone eventually reaches the feed section and the heaters reciprocate for another cycle, the liquid freezes and contracts, thereby drawing feed down into the column.

FIGURE 3 illustrates the ultimate solute distribution approached in the matter transport section after a large number of molten zones have traversed from the column. The solid material in the mattter transport section 36 is at a temperature $T_c$ and has a density $D_s$. $C(x)$ is the solute distribution and $C(x+h-l)$ is the shift in the solute distribution caused by passage of a liquid zone having a density $D_l$ at the temperature $T_h$. If the cross section of the column is unity, let:

$h$=the weight of solid material (originally at the temperature $T_c$ and having a density $D_s$) that is melted by a moving heater.
$l$=the weight of molten material at a temperature $T_h$ and a density $D_l$ that is maintained molten and caused to travel by a moving heater.
$h-l$=the weight of product collected per pass.
$L_e$=the weight of material in the column from the exit end to the point where the solute concentration is $kC_f$.
$L$=length of the enriching section needed to obtain a purification factor $\alpha$.
Volume occupied by $h$=volume occupied by $l$.

When these definitions are substituted for those with constant density used in the aforementioned book by Pfann, the derivation of the steady state equations for the void system may be substituted exactly for the matter transport system. Thus:

$$L_e = \frac{1}{0.434 B_e} \log W\left[\frac{x}{\alpha}-1\right]$$

where $B_e$, $W$, and $x$ are given by $$e^B e^h = 1 + \frac{B_e l}{k}$$

$$W = \frac{k}{(1-k)B_e}\left[1 - e^{(B_e h - 1)}\right]$$

$$x = (hk-l)/(h-l)$$

The length of the enriching section L is given by $$L = \frac{L_e}{D_e}$$

Our discussion thus far has concerned itself with a system wherein $D_l < D_s$ and $k < 1$. Most materials fall into this cateory; however, the apparatus shown in FIGURE 1 can be used to purify with other permutations of these two parameters. For the apparatus of application Ser. No. 81,203 and that of this invention, Table 1 lists the nature of each section and the direction of travel of the heaters for all combinations of density and segregation coefficient relationships.

When the matter transport section is the stripping section, the same type of change in the definition, $h$, $l$, $h-l$, $L_s$, and $L$, as was used to describe the matter transport enriching section, is employed. The corrected steady state equations, describing the stripping section of the void system for the matter transport stripping section are given by:

$$L_s = \frac{1}{0.434 B_s} \log\left[\frac{\beta(\delta - k\mu)}{k(1-\beta\mu)}\right]$$

where $B_s$, $\delta$ and $\mu$ are constants given by $$e^{B_s l} = 1 + \frac{h}{k} \cdot B_s$$

$$\delta = k\left(\frac{h-l}{h}\right)l - k$$

$$\mu = \frac{h-l}{h-k_1}$$

and $$L = \frac{L_s}{D_s}$$

The continuous zone refining system described herein as well as that of application Ser. No. 81,203 were designed to provide greater flexibility and applicability of this method for purification and to provide the operator with the means for more rigid control of the operational parameters $h$ and $l$ by increasing planarity of the interfaces and improving the reproducibility of the product flow per pass. The matter transport section of these systems enables the product flow to be controlled within very fine limits. Material flow is adjusted by collecting an amount of material per pass which is equal to the difference in volume between a unit weight of material in its hot and cold condition. The reproducibility of product flow per pass is excellent because it is dependent on ability to control ambient and liquid temperatures both of which can be maintained within very narrow limits. The planarity of the interfaces is improved considerably by using coolers 44 as illustrated in FIGURES 1 and 2. The use of an inner core as at 22 and 46 to restrict the thickness of solid material which the moving heaters must melt also helps to maintain interface planarity.

For the most commonly encountered physical system with $k<1$ and $D_l<D_s$, matter transport increases apparatus design flexibility. Thus, in the enriching section, the heaters can travel down with the coolers positioned above them. In this position, the coolers can eliminate the nonplanarity at the interface caused by the natural tendency of heat to rise. By positioning both the enriching and stripping sections below the feed, one may utilize the matter transport phenomenon as a means of material movement with any $D_s$, $D_l$ ratio and $k$ value.

It should be understood that any conventional drive system may be used which is capable of causing heater and cooler movement in accordance with the teachings of zone refining. In addition, conventional materials which avoid contamination of the product are to be utilized in the construction of the purification system. Thus, an apparatus having greater flexibility than that heretofore achieved has been devised without inhibiting the purity of the product.

Although the invention has been described with reference to a particular embodiment, it will be understood to those skilled in the art that the invention is capable of a variety of alternative embodiments within the spirit and scope of the appended claim.

I claim:

Apparatus for separating the ingredients of a fusible material comprising a substantially horizontal feed hopper, heating means around said hopper for maintaining the material in a molten state, a pair of vertically oriented containers depending from said feed hopper, a void former proximate to the lowermost end of one of said pair of containers, timed heating means around said container adjacent said void former, said other of said pair of containers having an outlet at its portion opposite said feed hopper, said other of said pair of containers and its outlet forming a U-bend, heating means for maintaining the material in said outlet in a molten state, means along each of said containers for causing alternately hot and cold zones within said containers, and means for moving said last-mentioned means along said containers.

References Cited by the Examiner

UNITED STATES PATENTS

| 2,739,045 | 3/1956 | Pfann | 23—293 X |
| 2,739,046 | 3/1956 | Pfann | 23—293 X |

OTHER REFERENCES

Zone Melting by William G. Pfann ©, John Wiley & Sons, Inc., 1960, pp. 46–50 and 117–125.

"Void Former for Continuous-Void-Zone Purification," Review of Scientific Instruments, by John K. Kennedy, pp. 387–388, volume 33, January 1962.

NORMAN YUDKOFF, *Primary Examiner.*

G. HINES, *Assistant Examiner.*